(12) United States Patent
Lillig

(10) Patent No.: US 6,481,374 B1
(45) Date of Patent: Nov. 19, 2002

(54) DEER FEEDER

(76) Inventor: James A. Lillig, 22310 Y Hwy., Peculiar, MO (US) 64078

( * ) Notice: Subject to any disclaimer, the term of this patent is extended or adjusted under 35 U.S.C. 154(b) by 0 days.

(21) Appl. No.: 10/039,990

(22) Filed: Dec. 31, 2001

Related U.S. Application Data

(63) Continuation-in-part of application No. 09/766,788, filed on Jan. 22, 2001, now abandoned.

(51) Int. Cl.⁷ .............................................. A01K 61/02
(52) U.S. Cl. ................................................... 119/52.1
(58) Field of Search ........................... 119/52.1, 51.01, 119/52.2, 57.91, 477

(56) References Cited

U.S. PATENT DOCUMENTS

| | | | |
|---|---|---|---|
| 1,225,645 A | 5/1917 | Kennedy | 119/52.1 |
| 1,274,375 A | 8/1918 | Blows | 119/52.1 |
| 3,515,098 A | 6/1970 | Thurmond | 119/51.01 |
| 3,866,576 A | 2/1975 | Downing | 119/477 |
| 4,432,304 A | 2/1984 | Johnson | 119/477 |
| 4,538,548 A | 9/1985 | Page | 119/52.1 |
| 4,896,628 A | 1/1990 | Kadunce | 119/52.2 |
| 4,945,859 A | 8/1990 | Churchwell | 119/57.91 |
| 4,966,098 A | 10/1990 | Freeman | 119/52.2 |
| 5,016,572 A | 5/1991 | Weber | 119/52.1 |
| 5,345,892 A | 9/1994 | Khan | 119/51.5 |
| 5,404,838 A | 4/1995 | Khan | 119/52.1 |
| 5,410,986 A | 5/1995 | Washam | 119/52.2 |
| 5,819,686 A | 10/1998 | Credeur | 119/51.5 |
| 5,862,883 A | 1/1999 | Carriere | 182/135 |
| 5,992,349 A | 11/1999 | Sachs | 119/52.1 |

FOREIGN PATENT DOCUMENTS

| | | |
|---|---|---|
| DE | 2714030 | 12/1978 |

*Primary Examiner*—Charles T. Jordan
*Assistant Examiner*—Elizabeth Shaw
(74) *Attorney, Agent, or Firm*—Shughart, Thomson & Kilroy, PC; Kent R. Erickson

(57) ABSTRACT

A deer feeder adapted for hanging in a tree is provided. The feeder includes an upright tubular feed reservoir. A feeding port angles upwardly from and communicates with the feed reservoir proximate its bottom end. In a first embodiment of the feeder, a flexible support member such as a chain is connected to the reservoir proximate its top end and so as to be engageable with the tree to suspend the feeder therefrom and a cleat extends outwardly from the feed reservoir and engages the tree trunk in order to stabilize the feeder relative to the tree. In a second embodiment, the exterior surface of the feeder is corrugated so as to include a plurality of transverse ridges separated by grooves. The feeder is connected to a tree trunk by flexible securement members which encircle the feeder and engage the grooves on the exterior surface.

31 Claims, 2 Drawing Sheets

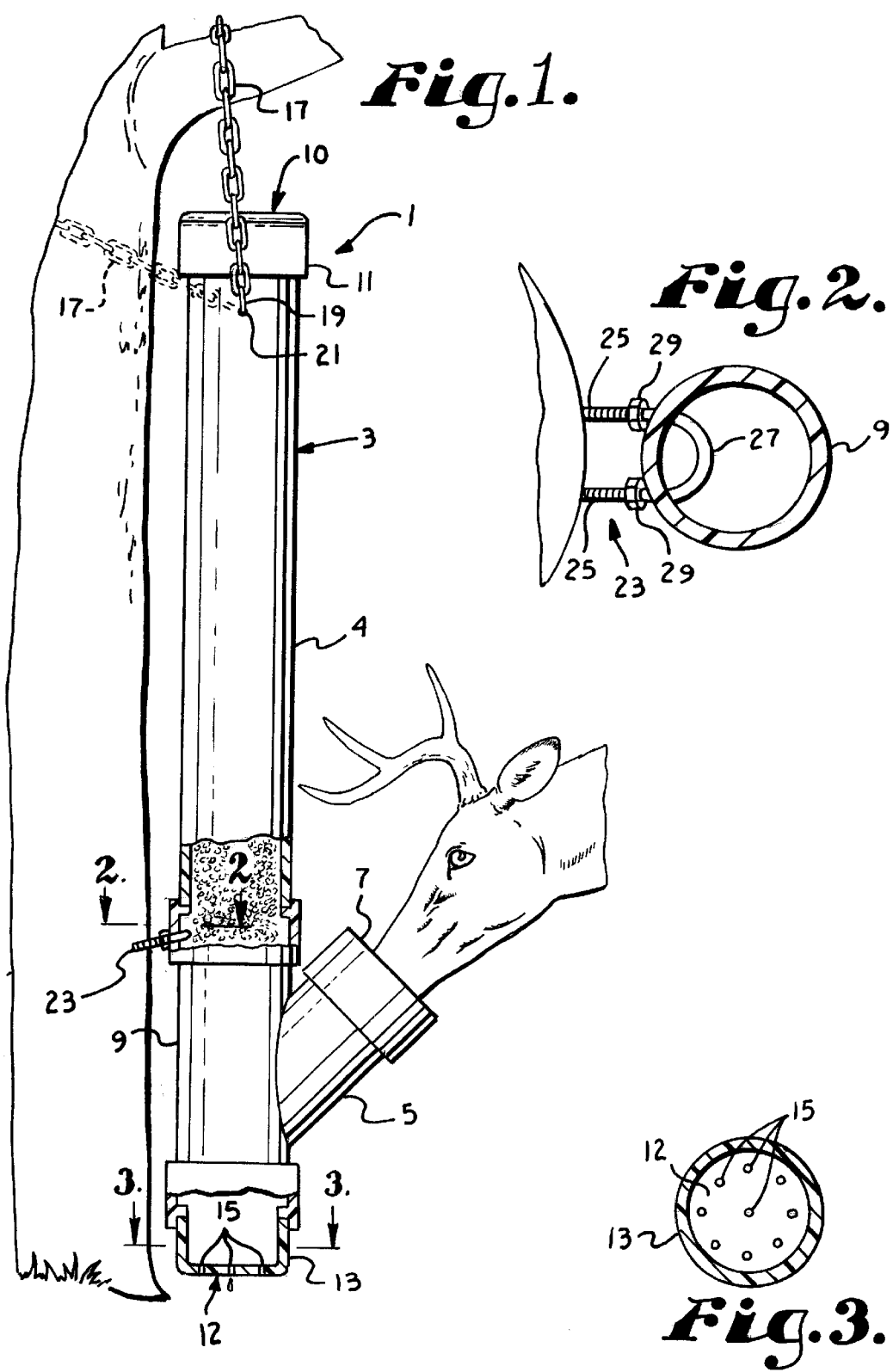

Fig.4.
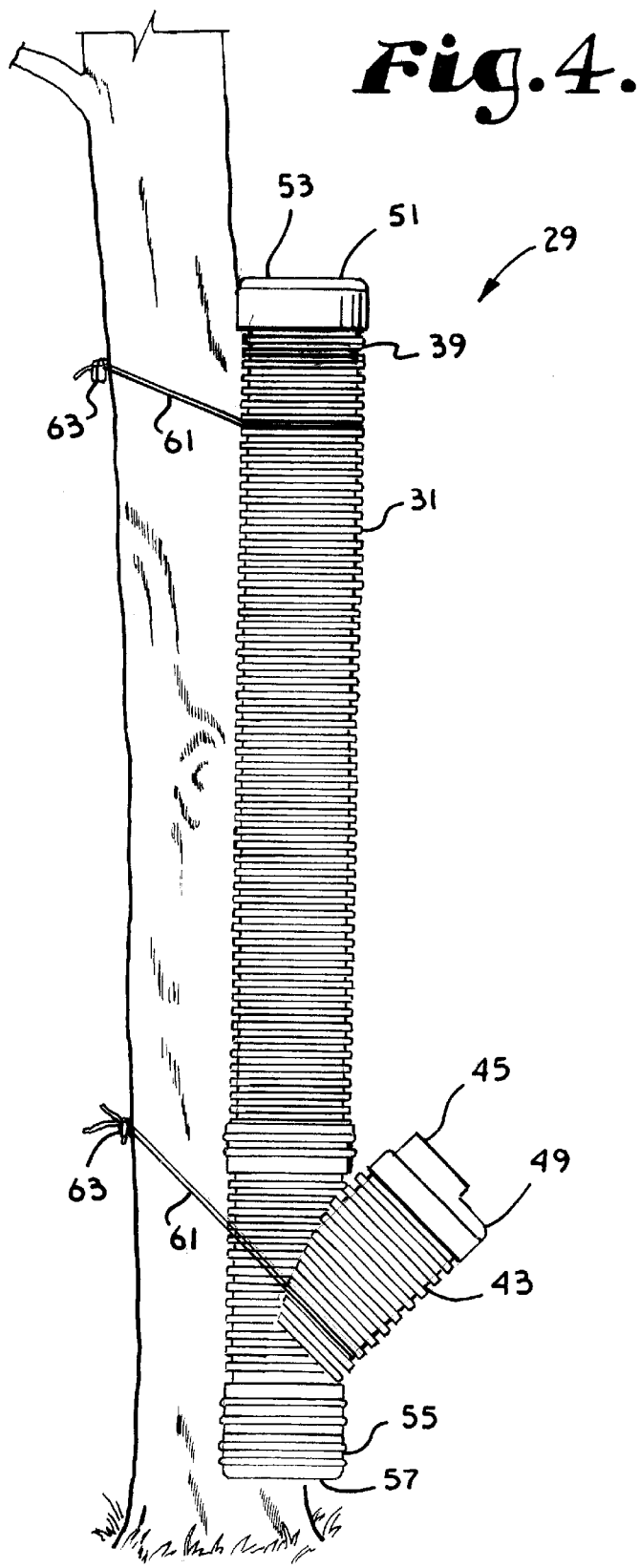
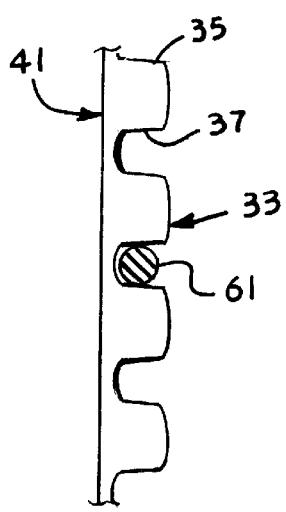
Fig.5.

DEER FEEDER

This application is a continuation-in-part of application Ser. No. 09/766,788 filed Jan. 22, 2001 now abandoned.

BACKGROUND OF THE INVENTION

1. Field of the Invention

The invention relates to a feeder for deer or similar animals which is designed to be suspended from a tree and filled with grain or other feed.

2. Description of the Related Art

Populations of deer in rural and suburban areas of large portions of the United States have been dramatically increasing in recent years. As the populations increase, the need for feed for the animals also increases. In bad years, feed can be scarce and starvation can occur. In order to help alleviate this problem, residents of the effected area sometimes wish to put out feed for the animals. Land owners hoping to draw and hold deer on their property can do so by making feed for the deer readily available.

Scattering loose feed on the ground is not very efficient. Much of the feed is wasted or consumed by undesirable species, such as rodents. Free-standing feeders for deer need to be very sturdy, as the large and powerful deer will quickly knock over a flimsy feeder, spilling the feed. As a result, free-standing feeders for deer are relatively expensive to build and difficult to transport.

What is needed is a cheap and effective feeder which preserves the feed and which the deer cannot easily topple or destroy.

SUMMARY OF THE INVENTION

The present invention comprises a deer feeder adapted for hanging in a tree. The feeder includes an upright tubular feed reservoir having a top end and a bottom end. A feeding port angles upwardly from and communicates with the feed reservoir proximate its bottom end. The feeding port has an open end through which deer can access feed from the reservoir. The feeder further includes a lid selectively closing the top end of the reservoir and a floor closing the bottom end.

In a first embodiment of the feeder, a flexible support member such as a chain is connected to the reservoir proximate its top end and so as to be engageable with the tree to suspend the feeder therefrom. A cleat extends outwardly from the feed reservoir and engages the tree trunk in order to stabilize the feeder relative to the tree.

In a second embodiment, the exterior surface of the feeder is corrugated so as to include a plurality of transverse ridges separated by grooves. The feeder is connected to a tree trunk by flexible securement members, such as cables, which encircle the feeder and engage the grooves on the exterior surface.

BRIEF DESCRIPTION OF THE DRAWINGS

FIG. 1 is a side view of a first embodiment of a deer feeder according to the present invention with portions broken away to show interior detail.

FIG. 2 is a cross-sectional view of the feeder taken generally along line 2—2 in FIG. 1.

FIG. 3 is a cross-sectional view of the feeder taken generally along line 3—3 in FIG. 1.

FIG. 4 is a side view of a second embodiment of a deer feeder according to the present invention.

FIG. 5 is an enlarged fragmentary cross-sectional view of a portion of the exterior wall of the feeder of FIG. 4.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a deer feeder embodying the present invention. The feeder 1 may be easily constructed using plastic pipe such as PVC, CPVC, or ABS pipe and readily available fittings therefor. The invention is not to be limited to this type of construction, however, as a comparable feeder 1 could be produced using a variety of other methods including, but not limited to: injection molding or forming out of sheet material.

Referring to FIG. 1, the feeder 1 includes an upright tubular feed reservoir 3, which may comprise a length of plastic pipe 4 having a diameter of, for example, six inches. A feeding port 5 is connected to the reservoir 3 proximate the bottom end thereof and communicates with the interior of the reservoir 3. The feeding port 5 angles upwardly from its point of connection to the reservoir 3 to an open end 7. The feeding port 5 is preferably of a smaller diameter than the reservoir 3, as the open end 7 only needs to be large enough for a deer or similar animal to insert its muzzle for feeding as shown in FIG. 1. A larger open end 7 would allow an unnecessary amount of feed to be spilled and wasted. A feeding port 5 having a diameter of two to four inches has been found to work acceptably well.

The feeding port 5 may be formed by connecting a 45 degree wye fitting 9 to the bottom of the pipe 4. A four inch diameter feeding port 5 may be fashioned on a six inch pipe 4 by using a 6×6×4 reducing wye 9. Alternatively, a reducer fitting (not shown) may be used to reduce the diameter of the bottom end of the pipe 4 down to either four inches or two inches, and a respective four inch or two inch wye 9 used to create the feeding port 5.

The top of the reservoir 3 is provided with a lid or first closure member 10 which may be in the form of a removable cap or plug 11. The cap 11 may be secured to the top of the reservoir 3 by threads (not shown). The removable cap 11 prevents rain and debris from entering the reservoir 3 while still allowing the reservoir 3 to be filled with feed through its top end. The bottom end of the reservoir 3 is enclosed by a floor or second closure member 12 such as a cap or plug 13. The cap 13 need not be removable, however cleaning of the feeder 1 would be facilitated if the cap 13 could be removed such as through the use of a threaded connection. The floor 12 preferably includes one or more drain holes 15 as shown in FIG. 3. The drain holes allow any water which enters the reservoir 3 through the open feeding port 5 to run out of the feeder 1, thereby reducing any spoilage of the feed therein which could be caused if water were allowed to accumulate in the reservoir 3.

A chain or other flexible member 17 is connected to the feeder 1 proximate the top of the reservoir 3 for suspending the feeder 1 from a tree. The chain 17 may be connected to the reservoir 3 by a pair of S-hooks 19 inserted in holes 21 bored in opposite sides of the reservoir 3. The chain 17 may be strung over a sturdy limb as shown in FIG. 1. Alternatively, the chain 17 may be wrapped around the trunk of the tree, as generally shown in phantom lines in FIG. 1.

The feeder 1 further includes a cleat 23 which serves to help stabilize the feeder 1 relative to the tree and restricts the feeder 1 from swinging laterally on the chain 17 as the animal feeds. The cleat 23 is positioned on the reservoir 3 on the back side thereof, i.e. on the side opposite the feeding port 5 and includes at least one projection or spike 25 which extends outwardly from the feeder 1 so as to be engageable with the trunk of the tree from which the feeder 1 is suspended. The cleat 23 is most effective when located at a point along the length of the reservoir 3 which is relatively far away from the point of attachment of the chain 17 and relatively close to the feeding port 5.

The cleat 23 may be formed by inserting a U-bolt 27 through appropriately spaced holes in the reservoir 3 and securing the U-bolt 27 in place using nuts 29 as shown in FIG. 2. A convenient location for installing the U-bolt 27 is inside the wye 9 proximate the joint between the wye 9 and the pipe 4. It is preferable for the spikes 25 of the cleat 23 to angle downward and away from the reservoir 3 so that the weight of the feeder 1 helps push the spikes 25 into engagement with the tree trunk.

In use, the feeder 1 is suspended from a tree by means of the flexible member 17, which may be looped over a convenient branch as shown in FIG. 1, or if no such branch is present, the flexible member 17 may be wrapped around the trunk of the tree. The feeder 1 is then filled with grain or other feed attractive to deer through the lid 10. The feed is allowed to fill the reservoir 3 and thereby becomes accessible to deer through the feeding port open end 7. The lid 10 is then closed to prevent water or debris from contaminating the feed. Deer will be attracted to the feeder 1 by the scent of the feed located therein.

Alternative Embodiment

FIGS. 4 and 5 depict an alternative embodiment 29 of the feeder 1. The feeder 29 has an upstanding tubular feed reservoir 31 having a corrugated exterior surface 33 comprising a plurality of longitudinally spaced annular ribs 35 separated by annular grooves 37. The feed reservoir 31 may be constructed using a length of corrugated pipe 39, such as six inch corrugated polyethylene drain pipe. The pipe is preferably of the double wall type having a smooth interior surface 41 so that feed will flow easily down the reservoir 31 and not accumulate on any interior ribs. Pipe of this type is manufactured by the Francesville Drain Tile Corp. of Francesville, Ind.

A feeding port 43 is connected to the reservoir 31 proximate the bottom end thereof and communicates with the interior of the reservoir 31. The feeding port 43 angles upwardly from its point of connection to the reservoir 31 to an open end 45. The feeding port 43 may be formed by connecting a 45 degree wye fitting 47 to the bottom of the pipe 39. As with the pipe 39, the wye fitting 47 has an exterior surface 33 comprising a plurality of longitudinally spaced annular ribs 35 separated by annular grooves and, preferably, a smooth interior surface 41. The wye fitting 47 may be a reducing fitting (not shown), or a reducer 49 may be used to reduce the open end 45 to a diameter smaller than that of the pipe 39, for example to four inches.

The top of the reservoir 31 is provided with a lid or first closure member 51 which prevents rain and debris from entering the reservoir 31 while still allowing the reservoir 31 to be filled with feed through its top end. The first closure member 51 may be in the form of a cap 53 which snaps into position by releasably engaging one or more of the ribs 35 on the exterior surface 33 of the pipe 39. The bottom end of the reservoir 31 is enclosed by a floor or second closure member 55 such as a cap 57 which preferably includes one or more drain holes (not shown) which allow any water which enters the reservoir 31 through the open feeding port 43 to run out of the feeder 29.

The feeder 29 is secured to a tree by flexible securement members 61 which may be plastic coated steel cable or similar material. The securement members 61 each simultaneously encircle the feeder 29 and the trunk of the tree and engage the feeder 29 by nestling within respective ones of the grooves 37. The ends of each securement member 61 are fastened together so as to tightly grip the feeder 29 against the tree. If the securement members 61 are cable, then cable clamps 63 may be used to fasten the ends together. Ideally, one securement member 61 is positioned below the feeding port 43, and another is positioned proximate the top of the reservoir 31. Respective ones of the ribs 35 on the feeder 29 bear against the securement members 61 to prevent the feeder 29 from slipping out of the securement members 61.

It is to be understood that while certain forms of the present invention have been illustrated and described herein, it is not to be limited to the specific forms or arrangement of parts described and shown. For example, it is foreseen that the second embodiment 29 of the deer feeder could incorporate elements of the first embodiment 1, such as the cleat 23, which could replace or supplement the lowermost of the two securement members 61.

What is claimed and desired to be secured by Letters Patent is as follows:

1. A deer feeder adapted for hanging in a tree proximate the trunk thereof, said feeder comprising:
   a) an upright tubular feed reservoir having a top end and a bottom end;
   b) a lid selectively closing said top end;
   c) a floor closing said bottom end;
   d) a feeding port angling upwardly from and communicating with said feed reservoir proximate said bottom end, said feeding port having an open end;
   e) a flexible support member connected to said reservoir proximate said top end and engageable with the tree to suspend said feeder therefrom; and
   f) a cleat extending outwardly from said feed reservoir and engageable with the tree trunk to stabilize said feeder relative to the tree trunk.

2. The deer feeder as in claim 1 wherein said floor includes a drain hole.

3. The deer feeder as in claim 1 wherein said cleat extends outwardly and downwardly relative to said reservoir.

4. The deer feeder as in claim 1 wherein said feeding port is smaller in diameter than said feed reservoir.

5. The deer feeder as in claim 1 wherein said feed reservoir is formed from a length of plastic pipe having a top end and a bottom end.

6. The deer feeder as in claim 5 wherein said feeding port is formed by adding a wye fitting to the bottom end of said length of plastic pipe.

7. The deer feeder as in claim 6 wherein said wye fitting is a reducing wye.

8. The deer feeder as in claim 6 wherein said lid is formed by a first cap or plug removably installed in said pipe top end.

9. The deer feeder as in claim 6 wherein said floor is formed by a second cap or plug installed in a bottom end of said wye fitting.

10. The deer feeder as in claim 9 wherein said second cap or plug has a number of drain holes formed therein.

11. The deer feeder as in claim 6 wherein said cleat comprises a U-bolt having legs extending outwardly through holes in said length of pipe or said wye fitting.

12. The deer feeder as in claim 11 wherein said U-bolt legs extend outwardly and downwardly from said length of pipe or said wye fitting.

13. A deer feeder adapted for hanging in a tree proximate the trunk thereof, said feeder comprising:
   a) a length of plastic pipe having a top end and a bottom end;
   b) a wye fitting secured to said bottom end of said length of pipe;
   c) a first closure member removably installed on said top end of said length of pipe;
   d) a closure member installed on a bottom end of said wye fitting;
   e) a flexible support member connected to said length of pipe proximate said top end and engageable with the tree to suspend said feeder therefrom; and
   f) a cleat extending outwardly from said length of pipe or said wye fitting and engageable with the tree trunk to stabilize said feeder relative to the tree trunk.

14. The deer feeder as in claim 13 wherein said wye fitting is a reducing wye.

15. The deer feeder as in claim 13 wherein said cleat comprises a U-bolt having legs extending outwardly through holes in said length of pipe or said wye fitting.

16. The deer feeder as in claim 15 wherein said U-bolt legs extend outwardly and downwardly from said length of pipe or said wye fitting.

17. A deer feeder adapted for hanging in a tree proximate the trunk thereof, said feeder comprising:
   a) an upright tubular feed reservoir having a top end and a bottom end;
   b) a lid selectively closing said top end;
   c) a floor closing said bottom end; and
   d) a feeding port angling upwardly from and communicating with said feed reservoir proximate said bottom end, said feeding port having an open end; wherein
   e) said feed reservoir includes an exterior surface having longitudinally spaced ribs separated by grooves, one of said grooves receiving a first flexible securement member which is adapted to simultaneously encircle said feeder and the tree to secure said feeder to the tree.

18. The deer feeder as in claim 17 wherein said feeding port includes an exterior surface having longitudinally spaced feeding port ribs separated by feeding port grooves, one of said feeding port grooves receiving a second flexible securement member which is adapted to simultaneously encircle said feeder and the tree to further secure said feeder to the tree.

19. The deer feeder as in claim 17 wherein said floor includes a drain hole.

20. The deer feeder as in claim 17 wherein said feeding port is smaller in diameter than said feed reservoir.

21. The deer feeder as in claim 17 wherein said feed reservoir is formed from a length of plastic pipe having a top end and a bottom end.

22. The deer feeder as in claim 21 wherein said feeding port is formed by adding a wye fitting to the bottom end of said length of plastic pipe.

23. The deer feeder as in claim 22 wherein said lid is formed by a first cap or plug removably installed in said pipe top end.

24. The deer feeder as in claim 23 wherein said floor is formed by a second cap or plug installed in a bottom end of said wye fitting.

25. The deer feeder as in claim 24 wherein said second cap or plug has a number of drain holes formed therein.

26. A deer feeder adapted for hanging in a tree proximate the trunk thereof, said feeder comprising:
   a) a length of corrugated plastic pipe having a top end and a bottom end, said length of pipe having an exterior surface having longitudinally spaced ribs separated by grooves;
   b) a corrugated wye fitting secured to said bottom end of said length of pipe, said wye fitting having an exterior surface having longitudinally spaced ribs separated by grooves;
   c) a first closure member removably installed on said top end of said length of pipe;
   d) a second closure member installed on a bottom end of said wye fitting; and
   e) a first flexible securement member received by one of said grooves and adapted to simultaneously encircle said feeder and the tree to secure said feeder to the tree.

27. The deer feeder as in claim 26 wherein said first flexible securement member is received by a groove located proximate said top end of said length of pipe.

28. The deer feeder as in claim 26 wherein said first flexible securement member is received by a groove in said wye fitting.

29. The deer feeder as in claim 27 and further including a second flexible securement member received by a groove in said wye fitting.

30. The deer feeder as in claim 27 and further including a cleat extending outwardly from said length of pipe or said wye fitting and engageable with the tree trunk to stabilize said feeder relative to the tree trunk.

31. The deer feeder as in claim 29 and further including a second flexible securement member received by a groove located proximate said top end of said length of pipe.

* * * * *